US010708231B2

(12) United States Patent
Padmanabhan et al.

(10) Patent No.: US 10,708,231 B2
(45) Date of Patent: *Jul. 7, 2020

(54) USING HEADERSPACE ANALYSIS TO IDENTIFY UNNEEDED DISTRIBUTED FIREWALL RULES

(71) Applicant: Nicira, Inc., Palo Alto, CA (US)

(72) Inventors: Amar Padmanabhan, Menlo Park, CA (US); Amre Shakimov, San Jose, CA (US); Anupam Chanda, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,152

(22) Filed: Aug. 6, 2018

(65) Prior Publication Data

US 2018/0375832 A1 Dec. 27, 2018

Related U.S. Application Data

(63) Continuation of application No. 14/829,567, filed on Aug. 18, 2015, now Pat. No. 10,044,676.

(60) Provisional application No. 62/143,021, filed on Apr. 3, 2015.

(51) Int. Cl.
*H04L 29/06* (2006.01)

(52) U.S. Cl.
CPC .................. *H04L 63/0263* (2013.01)

(58) Field of Classification Search
CPC .................. H04L 63/02; H04L 63/10
See application file for complete search history.

(56) References Cited

U.S. PATENT DOCUMENTS

| | | | |
|---|---|---|---|
| 6,118,760 A | 9/2000 | Zaumen et al. |
| 6,792,423 B1 | 9/2004 | Jeffries et al. |
| 6,834,139 B1 | 12/2004 | Prairie et al. |
| 7,079,544 B2 | 7/2006 | Wakayama et al. |
| 7,089,240 B2 | 8/2006 | Basso et al. |
| 7,194,661 B1 | 3/2007 | Payson |

(Continued)

FOREIGN PATENT DOCUMENTS

| | | |
|---|---|---|
| WO | 2012093429 A1 | 7/2012 |
| WO | 2012126488 A1 | 9/2012 |
| WO | 2015006354 A1 | 1/2015 |

OTHER PUBLICATIONS

Berde, Pankaj, et al., "ONOS Open Network Operating System An Open-Source Distributed SDN OS," Dec. 9, 2013, 34 pages.

(Continued)

*Primary Examiner* — Izunna Okeke
(74) *Attorney, Agent, or Firm* — Adeli LLP

(57) ABSTRACT

Some embodiments provide a method for identifying unnecessary firewall rules for a distributed firewall of a logical network. The method identifies a firewall policy for network traffic of the logical network. The firewall policy includes a set of firewall rules. The method generates a set of data for implementing the firewall policy on a set of managed forwarding elements that implement the logical network. The method analyzes potential network traffic based on the generated set of data to identify a subset of unnecessary data. The method identifies a subset of unnecessary firewall rules of the set of firewall rules that corresponds to the subset of unnecessary data.

20 Claims, 10 Drawing Sheets

(56) References Cited

U.S. PATENT DOCUMENTS

| | | |
|---|---|---|
| 7,349,382 B2 | 3/2008 | Marimuthu et al. |
| 7,702,630 B2 | 4/2010 | Basso et al. |
| 7,827,591 B2 | 11/2010 | Sharma et al. |
| 8,693,344 B1 | 4/2014 | Adams et al. |
| 8,750,164 B2 | 6/2014 | Casado et al. |
| 8,942,085 B1 | 1/2015 | Pani et al. |
| 8,964,569 B2 | 2/2015 | Jocha et al. |
| 8,971,338 B2 | 3/2015 | Mishra et al. |
| 9,042,234 B1 | 5/2015 | Liljenstolpe et al. |
| 9,071,529 B2 | 6/2015 | Garg et al. |
| 9,225,601 B2 | 12/2015 | Khurshid et al. |
| 9,276,904 B2 | 3/2016 | Bansal et al. |
| 9,667,653 B2 | 5/2017 | Barabash et al. |
| 9,674,087 B2 | 6/2017 | Jackson et al. |
| 9,742,666 B2 | 8/2017 | Zhang et al. |
| 9,755,963 B2 | 9/2017 | Zhang et al. |
| 9,762,619 B1 | 9/2017 | Vaidya et al. |
| 10,044,676 B2 | 8/2018 | Padmanabhan et al. |
| 10,237,172 B2 | 3/2019 | Zhang et al. |
| 2004/0037276 A1 | 2/2004 | Henderson et al. |
| 2005/0053079 A1 | 3/2005 | Havala |
| 2005/0135351 A1 | 6/2005 | Parmar et al. |
| 2006/0029056 A1 | 2/2006 | Perera et al. |
| 2006/0182037 A1 | 8/2006 | Chen et al. |
| 2006/0206655 A1 | 9/2006 | Chappell et al. |
| 2006/0230442 A1* | 10/2006 | Yang .................. H04L 63/0263 726/11 |
| 2008/0148382 A1* | 6/2008 | Bartholomy ............ H04L 12/66 726/11 |
| 2011/0072506 A1* | 3/2011 | Law .................... H04L 63/0227 726/11 |
| 2011/0137877 A1 | 6/2011 | Strassner et al. |
| 2011/0320632 A1 | 12/2011 | Karino |
| 2012/0155467 A1 | 6/2012 | Appenzeller |
| 2012/0303835 A1 | 11/2012 | Kempf et al. |
| 2013/0128746 A1 | 5/2013 | Yedavalli |
| 2013/0163602 A1 | 6/2013 | Kang et al. |
| 2013/0176850 A1 | 7/2013 | Mishra et al. |
| 2013/0246655 A1 | 9/2013 | Itoh |
| 2014/0133305 A1 | 5/2014 | Brolin et al. |
| 2014/0146674 A1 | 5/2014 | Wang et al. |
| 2014/0241356 A1 | 8/2014 | Zhang et al. |
| 2015/0009830 A1 | 1/2015 | Bisht et al. |
| 2015/0016279 A1 | 1/2015 | Zhang et al. |
| 2015/0016460 A1 | 1/2015 | Zhang et al. |
| 2015/0043585 A1 | 2/2015 | Iihoshi et al. |
| 2015/0117454 A1 | 4/2015 | Koponen et al. |
| 2015/0222446 A1 | 8/2015 | Suresh et al. |
| 2015/0237013 A1 | 8/2015 | Bansal et al. |
| 2015/0358434 A1 | 12/2015 | Parthasarathy et al. |
| 2016/0057014 A1 | 2/2016 | Thakkar et al. |
| 2016/0057052 A1 | 2/2016 | Zhang et al. |
| 2016/0112460 A1 | 4/2016 | Li et al. |
| 2016/0173535 A1 | 6/2016 | Barabash et al. |
| 2016/0294772 A1 | 10/2016 | Padmanabhan et al. |
| 2016/0323318 A1 | 11/2016 | Terrill et al. |
| 2017/0339188 A1 | 11/2017 | Jain et al. |
| 2017/0346732 A1 | 11/2017 | Zhang et al. |
| 2018/0063193 A1 | 3/2018 | Chandrashekhar et al. |
| 2018/0063195 A1 | 3/2018 | Nimmagadda et al. |
| 2018/0123880 A1 | 5/2018 | Wen et al. |
| 2018/0227184 A1 | 8/2018 | Mentze et al. |
| 2018/0287885 A1 | 10/2018 | Shakimov et al. |
| 2019/0036782 A1 | 1/2019 | Smith |
| 2019/0199623 A1 | 6/2019 | Zhang et al. |

OTHER PUBLICATIONS

Gupta, Pankaj, et al., "Packet Classification on Multiple Fields," In Proc. of SIGCOMM, Month Unknown, 1991, 14 pages, Stanford, California, USA.

Krishnaswamy, Umesh, et al., "ONOS Open Network Operating System—An Experimental Open-Source Distributed SDN OS," Apr. 16, 2013, 24 pages.

Non-Published Commonly Owned U.S. Appl. No. 15/471,110, filed Apr. 2, 2017, 34 pages, Nicira, Inc.

Pfaff, Ben, et al., "OpenFlow Switch Specification," Sep. 6, 2012, 128 pages, The Open Networking Foundation.

Singh, Sumeet, et al., "Packet Classification Using Mutidimensional Cutting," SIGCOMM '03, Aug. 25-19, 2003, 12 pages, Karlsruhe, Germany.

Xie, Geoffrey G., et al., "On Static Reachability Analysis of IP Networks," Month Unknown, 2005, 14 pages.

\* cited by examiner

USING HEADERSPACE ANALYSIS TO IDENTIFY UNNEEDED DISTRIBUTED FIREWALL RULES

CLAIM OF BENEFIT TO PRIOR APPLICATIONS

This application is a continuation application of U.S. patent application Ser. No. 14/829,567, filed Aug. 18, 2015, and now published as U.S. Patent Publication 2016/0294772. U.S. patent application Ser. No. 14/829,567 claims the benefit of U.S. Provisional Patent Application 62/143,021, filed Apr. 3, 2015. U.S. patent application Ser. No. 14/829,567, now published as U.S. Patent Publication 2016/0294772, is incorporated herein by reference.

BACKGROUND

Today, in certain virtualized network environments, network controllers generate a large number of flow entries to manage the behavior of forwarding elements, and distribute these flow entries to the forwarding elements. The forwarding elements (e.g., software forwarding elements such as virtual switches) manage the sending of packets between various physical and virtual entities based on these flow entries, which are rules that the forwarding elements apply to send the packets. A single forwarding element may apply several flow entries to a packet before sending the packet to its next destination.

It is difficult to determine whether every single one of the flow entries is necessary or which flow entries are necessary for which forwarding elements. It is also difficult to determine which features depend on a particular flow entry. In determining whether flow entries are necessary, solutions producing false positives (identifying flow entries as necessary even though they are not) are still useful, but solutions producing false negatives (identifying flow entries as unnecessary, even though they are necessary) can result in the elimination of needed flow entries and thereby cause problems in the system. A random packet injection approach, where random packets are injected into the system (e.g., using a simulator) to observe the set of flow entries that are employed, is an example of a solution with false negative results.

BRIEF SUMMARY

Some embodiments provide novel techniques for generating firewall flow entries based on a set of distributed firewall rules and analyzing the firewall flow entries to identify unreachable firewall flow entries. Some embodiments identify distributed firewall rules that are unnecessary or that can be modified based on the unreachable firewall flow entries.

The distributed firewall rules, in some embodiments, may be defined for multiple logical enforcement points in a logical network. For instance, a user configuring a logical network may define firewall rules for logical switch ports, logical switches generally, logical router ports, etc. These firewall rules are then implemented in a distributed fashion throughout a physical network, as with the logical forwarding elements (e.g., logical switches, logical routers) on which they are enforced.

Some embodiments represent packet headers and corresponding metadata (referred to generally as "packet headers") as a set of fields, and model the flow entries generated for a set of distributed firewall rules as transfer functions on the fields representing packet headers. Using these techniques, some embodiments identify firewall flow entries that will never be used. When firewall rules for different levels of a logical network (e.g., a logical switch port and a logical router port) conflict in their applicability, certain rules may become unreachable. For example, if a particular logical switch port drops all packets with certain characteristics that would have otherwise reached a logical router port, then the firewall flow entries for processing traffic with those characteristics at the logical router port would never be reached.

As mentioned, to perform firewall flow reachability analysis (i.e., determining which firewall flow entries will be used and which firewall flow entries will not be used), some embodiments model each of the flow entries (including both flow entries generated from firewall rules as well as forwarding flow entries) as transfer functions, then perform an analysis of all of the packets that could be processed by the different distributed firewall rules to identify firewall flow entries that are unreachable. In some embodiments, this analysis is performed recursively, as packet headers with some of the fields wildcarded could match numerous flow entries at a particular stage, depending on how a specific field is un-wildcarded (i.e., resolved to a particular value). Some embodiments begin with a fully wildcarded packet header, while other embodiments set some fields of the packet header (e.g., the input port). After inputting the full set of packet headers and identifying the sets of possible firewall flow entries matched by the sets of possible packets, some embodiments remove from the system the firewall flow entries that will never be matched, thereby saving memory on the managed forwarding elements. In addition, some embodiments modify or remove rules from the set of distributed firewall rules based on the firewall flow entries that will never be matched, by determining the rules that resulted in the unreachable flow entries.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
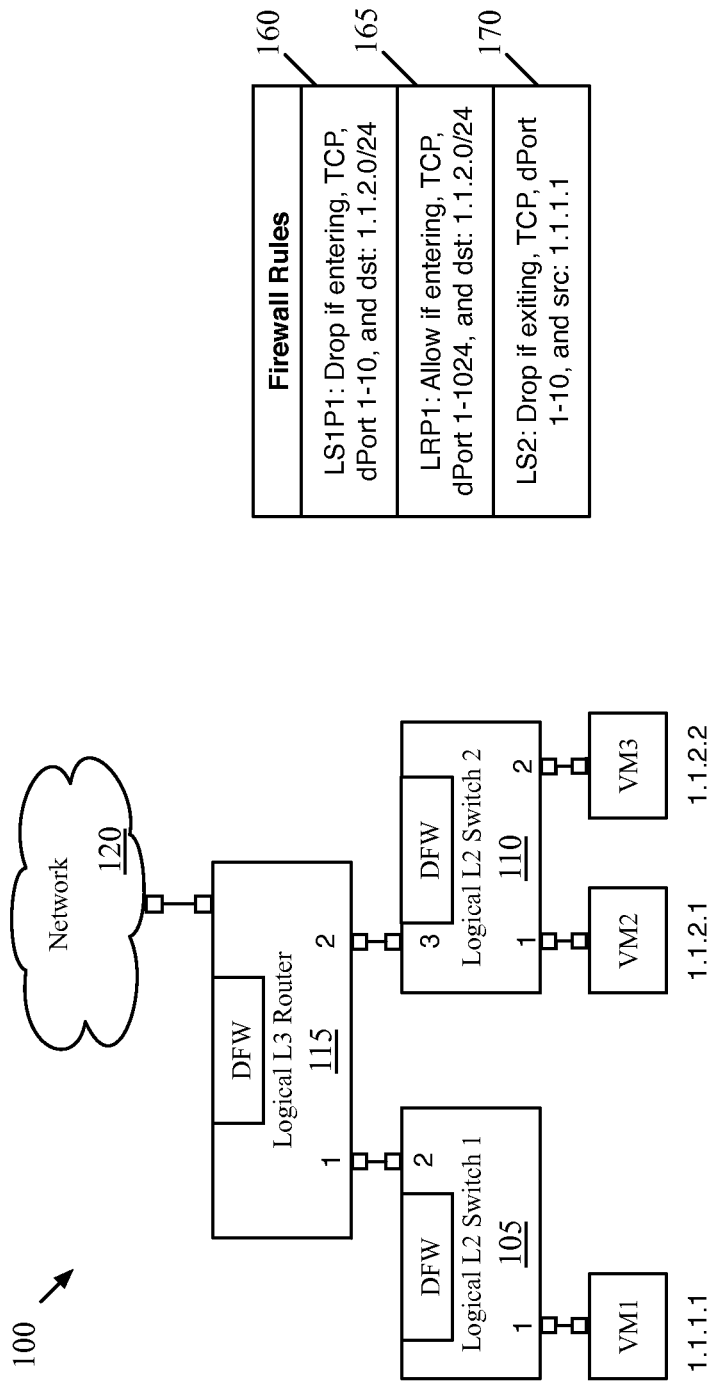
FIG. 1 conceptually illustrates an example logical network architecture of some embodiments.

Some embodiments provide novel techniques for generating firewall flow entries based on a set of distributed firewall rules and analyzing the firewall flow entries to identify unreachable firewall flow entries. Some embodiments identify distributed firewall rules that are unnecessary or that can be modified based on the unreachable firewall flow entries. The distributed firewall rules, in some embodiments, may be defined for multiple logical enforcement points in a logical network. For instance, a user configuring a logical network may define firewall rules for logical switch ports, logical switches generally, logical router ports, etc. These firewall rules are then implemented in a distributed fashion throughout a physical network, as with the logical forwarding elements (e.g., logical switches, logical routers) on which they are enforced.

Some embodiments represent packet headers and corresponding metadata (referred to generally as "packet headers") as a set of fields, and model the flow entries generated for a set of distributed firewall rules as transfer functions on the fields representing packet headers. Using these techniques, some embodiments identify firewall flow entries that will never be used. When firewall rules for different levels of a logical network (e.g., a logical switch port and a logical router port) conflict in their applicability, certain rules may become unreachable. For example, if a particular logical switch port drops all packets with certain characteristics that would have otherwise reached a logical router port, then the firewall flow entries for processing traffic with those characteristics at the logical router port would never be reached.

As mentioned, to perform firewall flow reachability analysis (i.e., determining which firewall flow entries will be used and which firewall flow entries will not be used), some embodiments model each of the flow entries (including both flow entries generated from firewall rules as well as forwarding flow entries) as transfer functions, then perform an analysis of all of the packets that could be processed by the different distributed firewall rules to identify firewall flow entries that are unreachable. In some embodiments, this analysis is performed recursively, as packet headers with some of the fields wildcarded could match numerous flow entries at a particular stage, depending on how a specific field is un-wildcarded (i.e., resolved to a particular value). Some embodiments begin with a fully wildcarded packet header, while other embodiments set some fields of the packet header (e.g., the input port). After inputting the full set of packet headers and identifying the sets of possible firewall flow entries matched by the sets of possible packets, some embodiments remove from the system the firewall flow entries that will never be matched, thereby saving memory on the managed forwarding elements. In addition, some embodiments modify or remove rules from the set of distributed firewall rules based on the firewall flow entries that will never be matched, by determining the rules that resulted in the unreachable flow entries.

To perform these operations, some embodiments use headerspace analysis, which analyzes the bits or fields of an entire packet header in order to analyze the networks through which the packets will be sent (e.g., a purely physical network, a logical network, a physical network that implements a logical network, etc.). Some embodiments of the invention provide a network controller that uses headerspace analysis to analyze the firewall flow entries generated by the network controller for a set of distributed firewall rules (or policies) of a particular logical network. Specifically, the network controller uses headerspace analysis to detect unnecessary firewall flow entries (sometimes referred to as "dead" flow entries) without producing false negative results (i.e., without classifying firewall flow entries as unnecessary when certain packets sent in the network could match those firewall flow entries). The network controller analyzes the firewall flow entries for one or more firewall rules and identifies distributed firewall rules that produce unreachable firewall flow entries. The network controller of some embodiments then modifies or removes the identified distributed firewall rules.

This specification often refers to packets and packet headers. The term "packet" is used here as well as throughout this application to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

As mentioned, some embodiments analyze the firewall flow entries generated by a network controller (or cluster of network controllers that form a network control system) for distributed firewall rules in a logical network. In some embodiments, the network control system generates firewall flow entries for all of the distributed firewall rules of the logical network to be implemented in a physical managed network (e.g., a private datacenter such as an enterprise site, a public datacenter, etc.).

FIG. 1 conceptually illustrates an example logical network architecture 100 with multiple distributed firewall (DFW) nodes (also referred to as enforcement points). The logical network 100 includes two logical switches 105 and 110 and a logical router 115. Each of the logical switches 105 and 110 connects several virtual machines (in this case, two virtual machines (VMs) are connected by each logical switch, though many networks will have far more VMs attached to each logical switch), and the logical router 115 connects the two logical switches (i.e., logical layer 2 domains) together. In addition, in some embodiments the logical router 115 connects the logical network to an external network 120 via one or more uplink ports.

At each of the logical forwarding elements (i.e., logical switches 105 and 110 and logical router 115), the network administrator that configures the logical network can also configure DFW rules in some embodiments. These rules may be applied to a logical switch port, a logical switch as a whole, and/or a logical router port in some embodiments. These different enforcement points in the logical network hierarchy for which DFW rules may be defined are referred to herein as DFW nodes. The right side of FIG. 1 illustrates examples of DFW rules for the different levels of the logical network hierarchy. In particular, the DFW rules are the rules that would apply to a packet that is sent from VM1 to VM3 through the logical network.

The first firewall rule 160 is defined for the first port of the first logical switch 105 (LS1P1), where the packet first enters the logical network. The rule drops any TCP traffic that enters through port 1 of the first logical switch 105 with destination transport ports 1-10, and destined for any destination machine with IP 1.1.2.0/24 (i.e., any machine attached to the second logical switch 110). The second firewall rule 165 is defined for the first port of the logical router 115 (LRP1). The rule allows TCP traffic that enters through port 1 of logical router 115, with destination transport ports 1-1024, and destined for any destination machine with IP 1.1.2.0/24. The rule basically allows any TCP traffic from the first logical switch 105 to the second logical switch 110. The third firewall rule 170 is defined for the second logical switch (LS2). The rule drops any TCP traffic to destination transport ports 1-10 that exits the second logical switch 110 with a source address of 1.1.1.1 (i.e., from VM1). Each of these rules may be defined by different administrators of the logical network (which would result in the conflicting rules). It should be noted that within this document, ports may be used to refer to logical ports (shown here typically as port 1, port 2, etc., but which may use longer identifiers, such as 16- or 32-bit identifiers, in practice) as well as the standard transport layer ports (typically assigned a number from 1-1024).

In some embodiments, the logical network is an abstract conception of a network generated by an administrator, which is implemented in a virtualized, distributed manner in a managed physical infrastructure (e.g., a datacenter). That is, the virtual machines that connect to the logical switches may reside on various different host machines within the infrastructure, and physical managed forwarding elements (e.g., software virtual switches) operating on these host machines implement some or all of the logical forwarding elements (logical switches, logical routers, etc.). In addition, the distributed firewall rules of some embodiments are also implemented in this distributed manner. In some embodiments, the managed forwarding element (e.g., a software virtual switch) that implements the logical network also implements the DFW rules for the logical network, while in other embodiments a different software module that runs alongside the managed forwarding implements the DRW rules.

Figure 2:
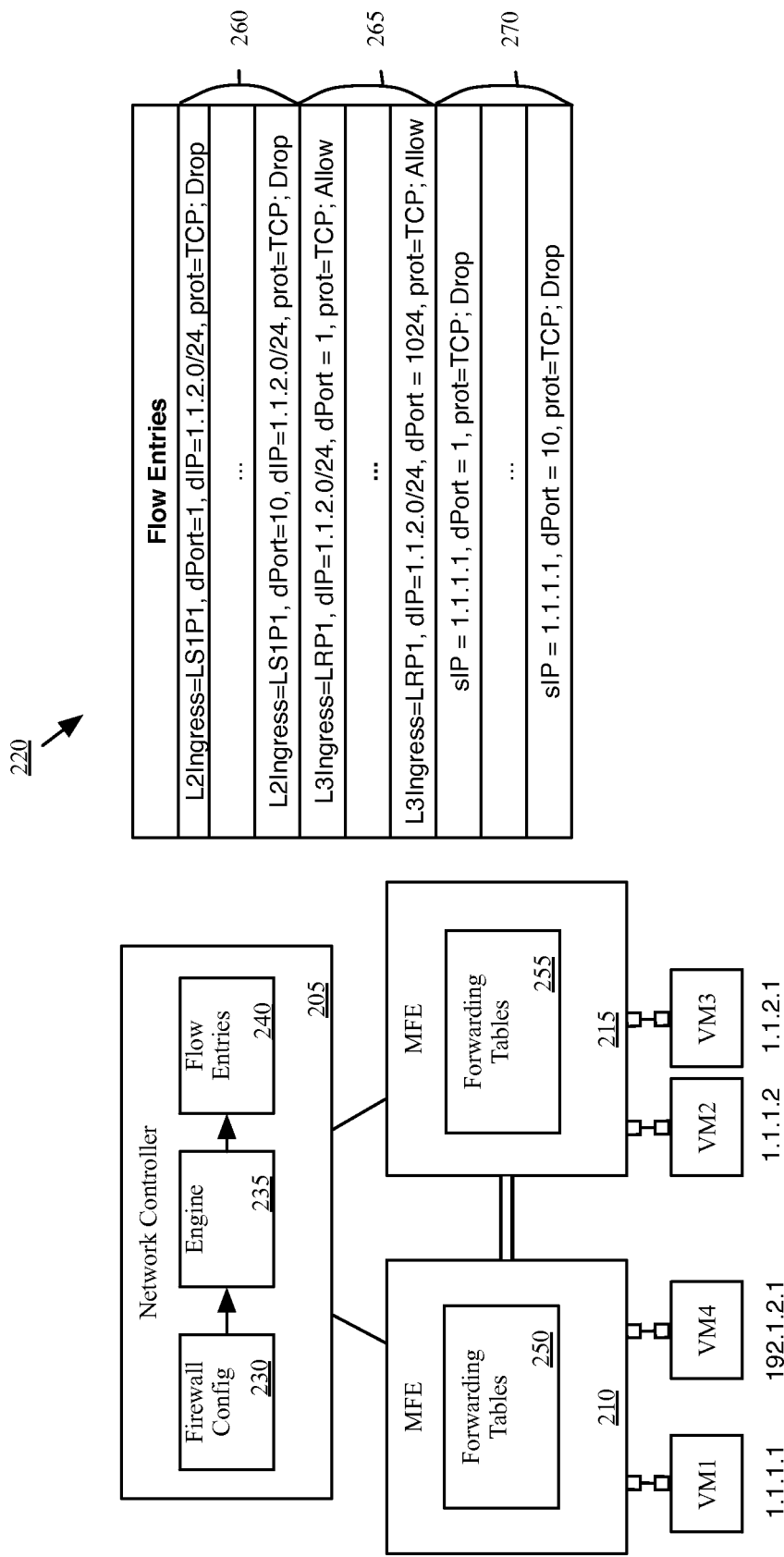
FIG. 2 conceptually illustrates a physical implementation of the logical network of FIG. 1.

FIG. 2 conceptually illustrates a simplified physical implementation of the logical network 100. As shown, the physical infrastructure of the managed network 200 includes a network controller 205, MFEs 210 and 215, and VMs 1-4. VMs 1-3 correspond to VMs 1-3 of the logical network architecture 100 of FIG. 1. In some embodiments, VM4 is a VM for a different logical network for a different tenant in a datacenter, where different tenants have separate logical networks that operate on the same physical network infrastructure. This figure also illustrates a set of firewall flow entries 220 generated by the network controller 205 based on a DFW configuration and stored in forwarding tables of the MFEs 210 and 215.

In some embodiments, network controller 205 and at least one of MFEs 210 and 215 and its associated VMs all reside on a single host, with the MFE implemented within virtualization software (e.g., a hypervisor, virtual machine monitor, etc.) that operates in the host. Alternatively or conjunctively, some or all of the elements may operate on separate hosts or computing devices. For example, in some embodiments, the network controller operates on a separate computing device from any of the MFEs or any of the associated VMs. It should be understood that the physical infrastructure of some embodiments will generally include numerous hosts with many virtual machines, from numerous logical networks.

In some embodiments, this MFE is a software virtual switch that operates within the virtualization software of the host (e.g., Open vSwitch, or another software forwarding element). In the implementation illustrated in FIG. 2, the MFEs 210 and 215 implement the logical switches 105 and 110, as well as at least portions of the logical router 115 (in some embodiments, separate gateway machines implement the connection of the logical router 115 to the external network 120).

The network controller 205 includes a firewall configuration 230, rules engine 235, and flow entries 240. In some embodiments, the firewall configuration 230 is data that defines the firewall policies for the logical network. This firewall configuration may be generated based on input from a network administrator through an API of the network controller. The network controller 205 of some embodiments uses the engine 235 to convert the logical firewall policies of the firewall configuration 230 to flow entries 240 (also shown as 220). In some embodiments, the flow entries 240 also include forwarding flow entries generated by the network controller based on the logical forwarding element configurations, for managing forwarding behaviors of the managed forwarding elements. In some embodiments, the network controller 205 sends the firewall flow entries (as well as the other forwarding entries) to forwarding tables 250 and 255 of MFEs 210 and 215 respectively in order to enforce the firewall configuration 230 of the logical forwarding elements (i.e., logical switches 105 and 110, and logical router 115).

As shown, each of the firewall flow entries 220 is made up of a set of qualifiers (also referred to as a flow expression) and a set of actions. A flow expression contains a set of match conditions, which filter packets based on the packet headers and/or metadata (e.g., source and destination addresses and ports stored for the packets by the MFEs 210 and 215). When a packet meets the match conditions for a particular flow entry, the MFE applies the set of actions (e.g., drop, allow, etc.) specified by the flow entry (in an order specified by the flow entry, in some embodiments) to the packet.

The firewall flow entries 220 include three sets of firewall flow entries 260, 265, and 270, corresponding to firewall rules 160, 165, and 170 of FIG. 1 respectively. In some implementations, generating firewall flow entries for a firewall rule results in a large number of firewall flow entries. Firewall flow entries 260, 265, and 270 are generated based on the firewall rules described with reference to FIG. 1 and the physical infrastructure of the managed network 200.

The first set of firewall flow entries 260 is generated based on the firewall rule for port 1 of the first logical switch (LS1P1), which drops any TCP traffic that enters through port 1 of the first logical switch with destination ports 1-10, and destined for any destination machine with IP 1.1.2.0/24 (i.e., any machine attached to the second logical switch 110). Thus, the flow entries would be matched by packets with a logical ingress port (information that would be stored in registers of the MFEs of some embodiments) of LS1P1, a destination IP address in 1.1.2.0/24, transport protocol of TCP, and a destination port in the range 1-10. This results in ten flow entries, one for each of the possible destination ports (assuming the ability to match over IP prefixes, but only single TCP port values). Each of these flow entries specifies dropping the packet as their action.

The second set of firewall flow entries 265 is generated based on the firewall rule for the first port of the logical router 115 (LRP1), which allows any TCP traffic entering the logical router at the first port LRP1 (which corresponds to the first logical switch 105), with a destination address in 1.1.2.0/24 (the IP subnet corresponding to the second logical switch 110). Thus, the flow entries would be matched by packets with a logical ingress port (on the logical router) of LRP1 (again, information that would be stored by the MFE during processing of the packet), a destination IP address in 1.1.2.0/24, a transport layer protocol of TCP, and any destination port. This results in 1024 flow entries, one for each of the destination ports. In some embodiments, however, even if a user specifically enters 1-1024 for the destination transport layer port for a rule, some embodiments identify this and remove the match over the port from the flow entries. In this case, only one flow entry would be needed. Each of these flow entries specifies allowing the packet as their action. In some embodiments, the flow entries are arranged in stages of a processing pipeline, with one or more register values used to store the stage. In this case, the flow entries would also include a match over the stage, and the action would update this stage register (so that the packet could then move on to the next stage of processing).

The third set of firewall flow entries 270 is generated based on the firewall rule for the second logical switch (LS2). The rule drops any TCP traffic to destination ports 1-10 that exits the second logical switch 110 with a source IP address of 1.1.1.1 (corresponding to VM 1). Thus, the flow entries 270 for this rule are matched by packets with a transport layer protocol of TCP, a source IP address of 1.1.1.1, and a destination port in the range 1-10 (i.e., 10 flow entries are generated for this rule). In some embodiments, the flow entries also match over a stage register value that indicates that the packet is exiting the logical switch (e.g., that logical forwarding for the logical switch has been performed). In other embodiments, sets of flow entries are generated for each of the logical ports (i.e., three flow entries for each logical egress port, for a total of thirty flow entries).

As seen in this example, in some implementations, a separate flow entry is generated for each of the potential destination ports (e.g., 1-1024) to which the firewall rule would apply. In such implementations, the number of firewall flow entries can quickly grow to be difficult to handle. As mentioned above, the managed forwarding elements (such as MFEs 210 and 215) do not necessarily need all of the firewall flow entries generated for the firewall configuration of the logical network, and therefore some embodiments perform analysis to identify which firewall flow entries need not be sent to the MFE. In order to perform this flow reachability analysis (i.e., determining which firewall flow entries will be used and which firewall flow entries will not be used), some embodiments model each of the flow entries (both forwarding and firewall flow entries) as transfer functions, then perform an analysis of all of the packets that could be processed through the logical forwarding elements.

In some embodiments, the analysis includes identifying all the possible paths along which packets travel through the logical network. In some embodiments, this analysis is performed recursively, as packet headers with some of the fields wildcarded could match numerous flow entries at a particular stage, depending on how a specific field is un-wildcarded (i.e., resolved to a particular value). After inputting the full set of packet headers and identifying the sets of possible flow entries matched by the sets of possible packets, some embodiments remove from the system the firewall flow entries that will never be matched, thereby saving memory on the MFEs.

In some embodiments, the network controller 205 identifies, based on the firewall flow entries that will never be matched, rules from the firewall configuration 230 that are either unnecessarily broad or no longer necessary. Some embodiments annotate flow entries with the firewall rule that generates a particular firewall flow entry. The network controller 205 then removes or modifies the identified rules and distributes a modified set of firewall flow entries to the MFEs 210 and 215.

The above description introduces the use of headerspace analysis to analyze firewall flow entries generated to implement a DFW for a logical network. Several more detailed embodiments are described below. First, Section I describes headerspace analysis in further detail. Section II then describes flow reachability analysis of some embodiments. Finally, Section III describes an electronic system with which some embodiments of the invention are implemented.

I. Headerspace Analysis

Before describing the applications to analysis of the firewall flow entries for a logical network, the details of headerspace analysis (HSA) will be introduced. In some embodiments, a network controller, or network analysis application analyzing the output of a network controller, performs HSA on the firewall flow entries generated by a network controller. HSA, in some embodiments, analyzes a range of bits or a set of fields (e.g., a headerspace) in a packet. The following description will describe the analysis in terms of bitwise analysis; however, in some embodiments the analysis analyzes the values of packet header and metadata fields, rather than individual bits.

In some embodiments, the bit range for analysis includes the first L bits of a packet that make up the packet header and M bits of metadata (e.g., register values, etc.) stored for the packet while it is processed by an MFE. The analysis application defines a region in a $\{0, 1\}^{L+M}$ space. In the discussion below, this space is called a Flow Space (FS), and a defined region in the space is called a Flow Region (FR). The flow space is an n-dimensional binary space, where n is the number of bits in the range of bits (L+M). For visualization purposes, a $\{0, 1\}^3$ flow space representing a three bit headerspace will be used within this Section. The 3D flow space has values of 0 and 1 along each axis. The x-axis represents the first bit of the headerspace, the y-axis represents the second bit, and the z-axis represents the third bit. This space effectively has eight possible values, as values between 0 and 1 are not allowed; however, the examples will show lines and planes in this space in order to illustrate wildcarded bits.

A flow region of the flow space is defined by the range of bits (e.g., headerspace) in a packet in some embodiments. In this example, a single point in the 3D space represents a particular combination of the three bits. For example, a bit combination of "100" would be represented in the flow space by a point at the coordinates (1,0,0).

Figure 3:
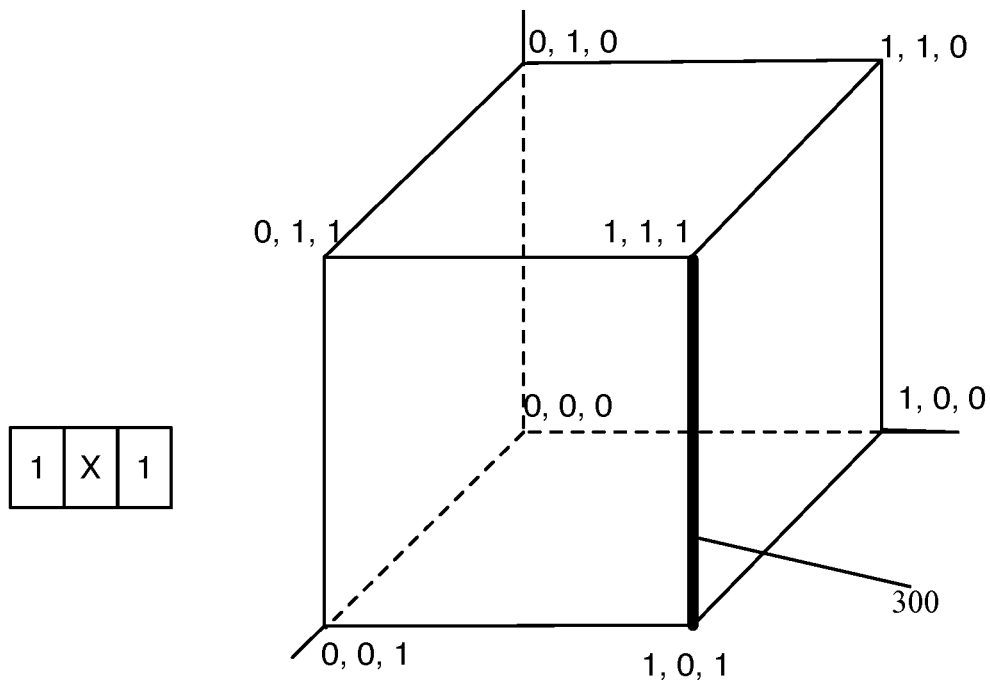
FIGS. 3 and 4 provide illustrative examples of flow regions in a 3-dimensional flow space.
Figure 4:
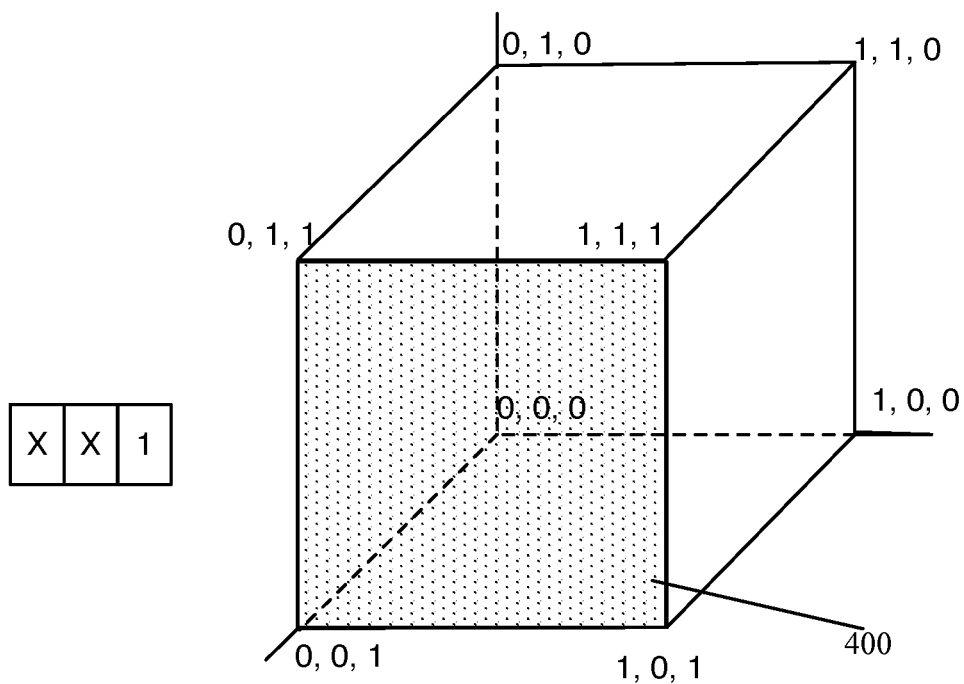

A region of the flow space is defined with the use of wildcards. FIGS. 3 and 4 provide illustrative examples of flow regions in a 3-dimensional flow space. Specifically, FIG. 3 illustrates that a bit combination of "1*1" is represented in the flow space by a line 300 (shown as bold) between the coordinates (1,0,1) and (1,1,1), where the wildcard (*) can be matched with either a 0 or a 1. FIG. 4 illustrates that a bit combination of "**1" is represented in the flow space by a plane 400 (shown as dotted) between the coordinates (0,1,1), (1,1,1), (1,0,1), and (0,0,1). In this case, both of the first two bits can be matched with either a 0 or a 1.

A flow region need not be a single contiguous region in some embodiments. For example, a flow region may be defined to include two separate regions, such as the set of bit combinations "**1" and "11*", represented by both the plane between (0,1,1), (1,1,1), (1,0,1), and (0,0,1) and the line between (1,1,0) and (1,1,1).

As described in further detail below, some embodiments of the invention use headerspace analysis to model the firewall flow entries generated by a network controller based on a DFW configuration. In some embodiments, a modeling application or module models each firewall flow entry as a transfer function.

Figure 5:
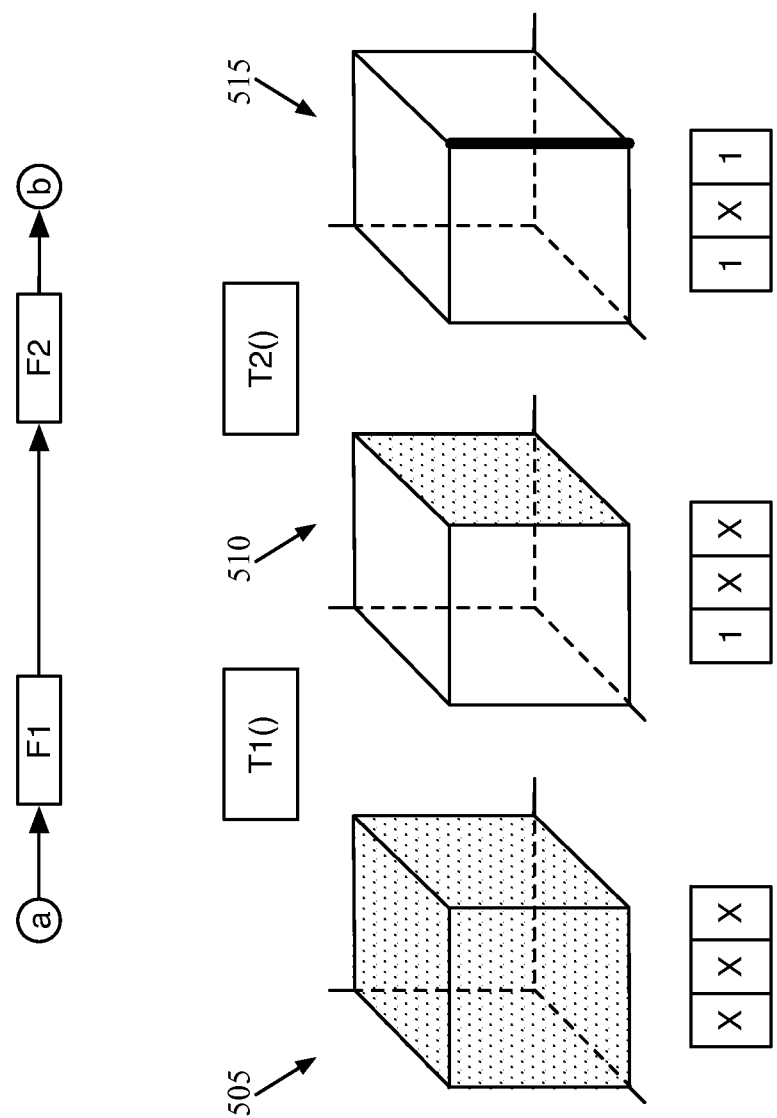
FIG. 5 illustrates an example of two transfer functions operating on flow regions between two network locations.

FIG. 5 illustrates an example of two transfer functions operating on flow regions between two network locations a and b. The network locations a and b may represent logical ports of logical switches, physical ports of a managed forwarding element, or even intermediate stages of a packet as the packet is processed by one or more DFW enforcement points implemented in a logical network. As shown in this figure, the packet matches two flow entries F1 and F2 between network location a and network location b.

These two flow entries are modeled as transfer functions T1( ) and T2( ), each of which maps a flow region in a 3-bit flow space into a new flow region in that space. Based on the effects of a particular firewall flow entry (e.g., the match conditions and corresponding actions), each transfer function receives as input a first region of a flow space and outputs a new region of the flow space. For example, a flow entry may write a value to a register, overwrite a section of a header (e.g., when performing MAC address replacement during IP routing), add a new field to the header, resolve an IP address over which the firewall rule matches, etc. Based on the effect of the flow entry on the headerspace, the modeling application calculates a function to describe the flow entry as a conversion of one flow region into another.

The effects of the transfer functions T1( ) and T2( ) are shown in the three flow regions 505-515 in 3-bit flow space. The first flow region 505 illustrates the flow region received at network location a. In this example, the input flow region 505 is the entire 3-bit flow space representing a fully wildcarded bitstream of "***". In some embodiments, the analysis application(s) use as input a flow region that spans the entire flow space (i.e., with every packet header field fully wildcarded), while other embodiments set certain fields (e.g., input ports) at the start of the flow reachability process.

The input flow region 505 is used as an input to the transfer function T1( ), and the second flow region 510 shows the output of the transfer function. This second flow region 510 represents all possible outputs that can result from a match of the flow entry F1, at which point the first bit has been resolved to a "1". This could be because the flow entry F1 only matches packets with a "1" for the first bit, or because the action specified by this flow entry sets the first bit to "1".

The second flow region 510 is then used as an input to the transfer function T2( ), and the third flow region 515 shows the output of this second transfer function. The third flow region 515 represents all possible outputs that can result from subsequent matches of the flow entries F1 and F2, at which point both the first and third bits have been resolved to "1", with the flow region being "1*1" and only the second bit wildcarded. In theory, the output flow region for a set of subsequent flow entries could be empty, if the flow entries were such that no packet could ever match them in the particular order.

As in the example of FIG. 5, the analysis application of some embodiments uses the transfer functions to model flow entries in order to determine the reachability for the firewall flow entries. In some embodiments, to perform the reachability analysis, the network controller stores packet headers as data structures such as objects, with the transfer functions representing flow entries behaving as functions that modify these objects. Some embodiments model the packet header according to a set of fields rather than as an n-bit space, the range of which may be limited by a number of available bits or other factors. For instance, register values may be allotted different numbers of bits in different embodiments, VLAN ID or MAC address fields are set sizes in the packet header, etc.

II. Flow Entry Reachability Analysis

One usage of headerspace analysis is in identifying unreachable firewall flow entries for a set of distributed firewall rules. The analysis of some embodiments then identifies the associated firewall rules for the unreachable firewall flow entries and removes or modifies the identified firewall rules.

Some embodiments determine all possible packet paths through the flow entries and identify which firewall flow entries are not reachable by any paths. A particular firewall flow entry is unreachable when no packet received by the logical network could ever match on the particular firewall flow entry. For example, a particular firewall flow entry generated for a particular firewall rule enforcement point may be unreachable if all of the packets that would match the particular firewall flow entry are dropped before they could ever reach the particular DFW enforcement point.

Figure 6:
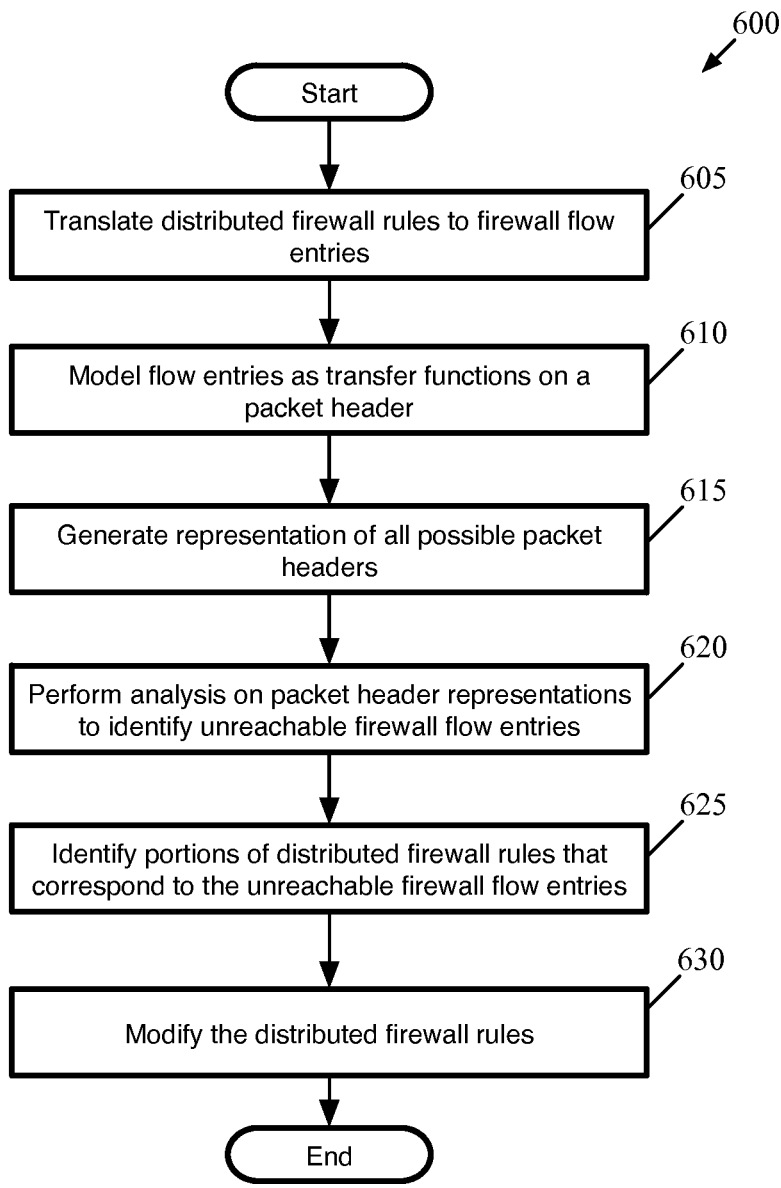
FIG. 6 conceptually illustrates a process of some embodiments for identifying and removing unreachable flow entries.

FIG. 6 conceptually illustrates a process 600 of some embodiments for identifying and modifying distributed firewall rules based on unreachable firewall flow entries of a distributed firewall. In some embodiments, the process 600 is performed by a network controller after the network controller generates flow entries for a logical network. For example, in an environment that uses powerful servers for the network controllers, and does not require flow entries to be distributed immediately after they are generated, the process 600 could be performed each time changes are made to a distributed firewall or to the configuration of the physical network (e.g., VMs are migrated, MFEs are added or removed, etc.).

Other embodiments, however, perform the process 600 in a testing situation before the network controllers and logical networks are deployed. For instance, before deploying a set of network controllers to manage a network, the physical network administrator (e.g., a private enterprise datacenter owner) could specify the network setup (e.g., the various logical forwarding elements and DFW rules). Flow reachability analysis can then be performed to identify firewall flow entries that do not need to be distributed to the managed forwarding elements or firewall rules that are unnecessary. By performing the analysis and modifying the DFW configuration before deployment, unnecessary firewall flow entries will not be generated during the actual deployment.

As shown, the process 600 begins (at 605) by translating distributed firewall rules to firewall flow entries for enforcing the distributed firewall rules. In some embodiments, the process also generates forwarding flow entries for defining forwarding behaviors of MFEs. As mentioned, the firewall rules might be entered by a network administrator for various enforcement points of a logical network.

The process 600 models (at 610) each of the received flow entries as a transfer function operating on a packet header. As noted above, in some embodiments, rather than treating the packet headerspace as a set of L+M bits, the headerspace is modeled as a set of fields based on the packet header and additional metadata stored by the MFEs for a packet. A transfer function T operates on a set of fields $\{f_1, f_2, \ldots f_N\}$, mapping a first set of values in this space to a second set of values in the space.

The process 600 also generates (at 615) a representation for all possible packet headers received by the MFE. In some embodiments, the analysis application does not begin with a fully wildcarded packet header and set of registers, because this would match all flow entries, and would fail to account for the stage-by-stage nature of the MFE processing of some embodiments. Thus, some embodiments set the context register of the packets to indicate that they are newly received packets, as well as generate representations for the various input ports at which a packet can be received. These various possible initial packet headers will be input into the analysis application for the reachability analysis (e.g., packets from each possible input port, with the context register set but the packet otherwise fully wildcarded). As described above, some embodiments create each of the packet header representations as an object, then use the transfer functions to manipulate the values of these objects.

With the inputs (packet headers) and operations (transfer functions) determined, the process performs (at 620) analysis on the packet header representations to identify the unreachable firewall flow entries. As described in detail below by reference to FIG. 7, some embodiments use a recursive process that processes each packet header in a depth-first manner. That is, the analysis application follows a path through a sequence of flow entries for a packet header, identifying the flow entries that a packet could match. When the packet processing is complete (i.e., the packet has matched a flow entry specifying to drop the packet or deliver the packet to its destination), the analysis application returns the packet to a previous stage in which it could have matched multiple flow entries (based on wildcarded fields), then chooses a different flow entry to complete the path. In this manner, the analysis application identifies all of the flow entries that a packet header can and cannot match.

Once the analysis has been performed to identify the unreachable firewall flow entries (i.e., those that could not be matched by any packet), the process identifies (at 625) portions of the distributed firewall rules that correspond to the unreachable firewall flow entries. The identified portions indicate portions of the distributed firewall rules that overlap with other distributed firewall rules and are unnecessary or overly broad. An example of identifying rules based on the unreachable firewall flow entries is described in further detail below with reference to FIG. 9.

Finally, the process modifies (at 630) the distributed firewall rules based on the unreachable firewall flow entries. In some embodiments, when the analysis application runs on a deployed network controller, this entails preventing the controller from distributing the firewall flow entries to the MFE, or sending a command to the MFE to remove the firewall flow entries from its memory. In other embodiments, the analysis application operates on a network controller or associated computer in a pre-deployment fashion. In such embodiments, the modification entails modifying or removing the distributed firewall rules so that only the necessary firewall rules are implemented in the actual deployment.

Figure 7:
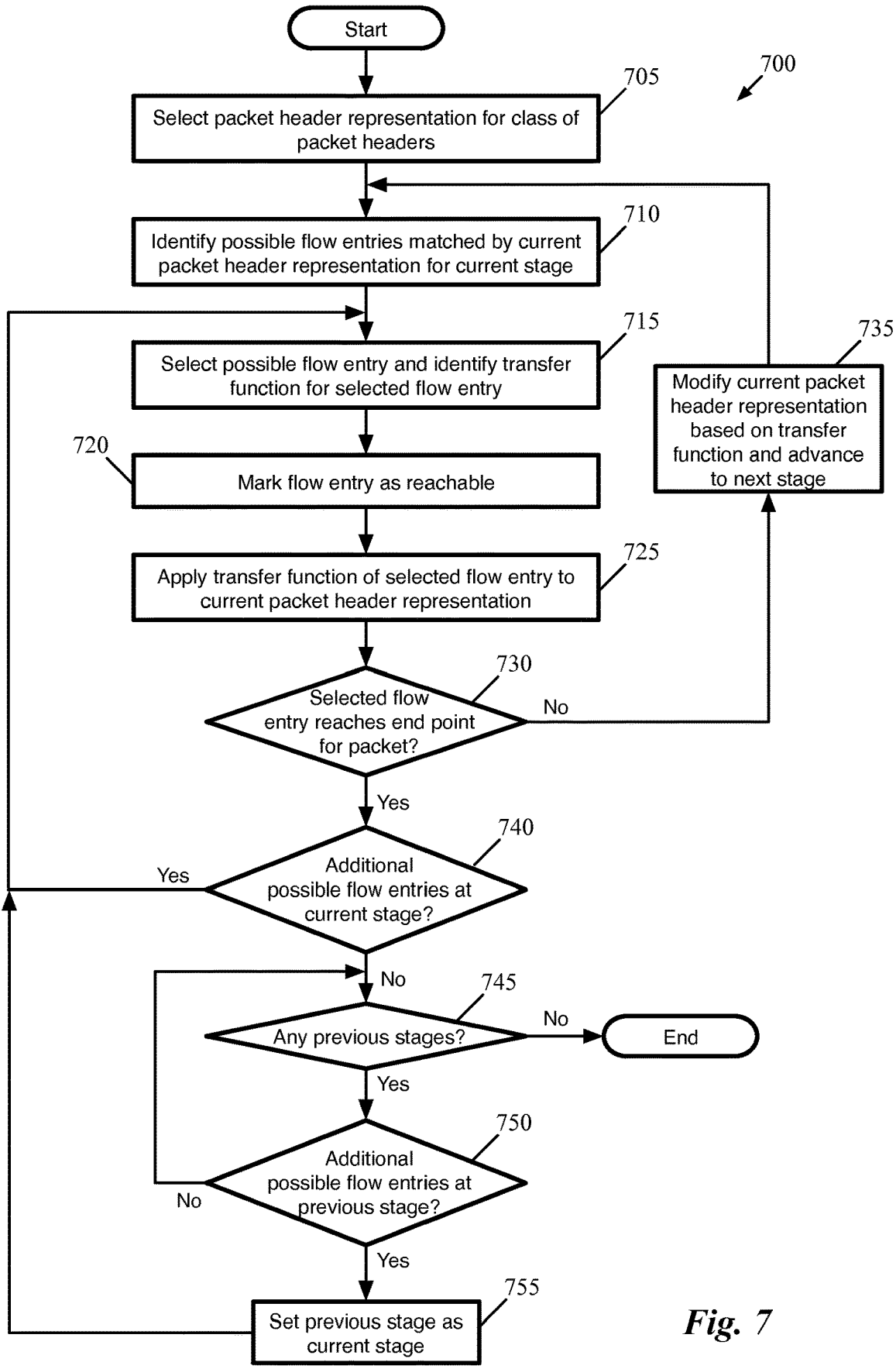
FIG. 7 conceptually illustrates a process for processing a single packet header representation through a set of flow entries.

As described above, some embodiments use a recursive process that processes each packet header in a depth-first manner in order to identify all the possible paths through the system and to identify unreachable firewall flow entries. FIG. 7 conceptually illustrates a process 700 of some embodiments for processing a single packet header representation (which may include wildcard fields) through a set of flow entries. The set of flow entries, in some embodiments, may be the firewall flow entries generated for a set of firewall rules of a set of DFW nodes and forwarding flow entries for multiple logical forwarding elements that include the DFW nodes.

The process assumes that not all of the packet header fields are wildcarded, however. For example, in this process the flow entries are organized in stages (e.g., ingress port mapping, multiple stages of DFW rules, one or more ACL stages, logical forwarding stages, tunneling stages, etc.), and the context register that identifies the stage is set to the value corresponding to the first stage upon input. Some embodiments also set the physical input port for the input packet header representation (a value stored in the metadata, in some embodiments).

As shown, the process 700 begins by selecting (at 705) a packet header representation for a class of packet headers. As indicated, this packet header representation may not represent a single specific packet, but rather a set of possible packets that could be received for a particular logical network. Thus, while some aspects of the packet might be defined in the packet header representation (e.g., the input port and the context register), many of the other fields will be wildcarded in the packet header representation (e.g., the destination MAC address, the VLAN ID (if used), etc.). Some embodiments wildcard the source MAC address, to simulate undesired address spoofing. Similarly, if the flow entries include L3 routing, some embodiments wildcard both the source and destination IP addresses, or at least the destination IP address.

The process then identifies (at 710) possible flow entries for the current stage matched by the current packet header representation. Initially, this will be the flow entries at the first packet processing stage that match the initially input packet header representation. Because of the wildcarded fields in the packet header representation, the packet header may match numerous flow entries at a particular stage. If the first stage matches on the physical input port in order to map this to a logical ingress port, then there might be only one matching flow entry. On the other hand, stages matching over a MAC address (either destination or source MAC) or other wildcarded field might have numerous possible matches. In some embodiments, the process 700 stores all of the identified possible matched flow entries along with the current representation of the packet header, so that the recursive process can apply each of the flow entries to the packet representation before completing.

Next, the process 700 selects (at 715) one of the flow entries identified at operation 710 and identifies the transfer function for the selected flow entry. In some embodiments, the flow entry is simply represented by the transfer function, and therefore selecting the flow entry is selecting the transfer function. Other embodiments, however, store a data structure for each flow entry and have a separate function representing the flow entry that operates on the packet header representations. In general, the order in which the flow reachability analysis application selects the possible flow entries for a particular stage is not of consequence.

Thus, the process 700 may select these flow entries in an order in which they are stored by the application, in a random order, etc.

Upon selection of the flow entry for analysis, the process marks (at 720) the selected flow entry as reachable. In some embodiments, this entails modifying a flag that is part of a data structure representing the flow entry (e.g., changing a bit value from 0 to 1). If the flow entry is already marked as reachable (e.g., because the flow entry had already been matched during a previous iteration through the current stage, or by a previous packet header representation), then the application does not modify this status.

Next, the process 700 applies (at 725) the transfer function for the selected flow entry to the current packet header representation. As described above, this modifies the current packet header representation according to the transfer function. Some fields may stay constant (i.e., if the fields are wildcarded they remain wildcarded), while other fields are resolved (e.g., if a flow entry matches over a wildcarded field or specifies an action to set a wildcarded field, such as a register) or modified (e.g., incrementing of a context register that identifies the current stage). Some embodiments also store the pre-modification packet header representation for use with the other possible flow entries for the current stage that were identified at 710, as these will be applied to the pre-modification packet header representation.

The process 700 then determines (at 730) whether the selected flow entry reaches an end point for the packet. For example, some flow entries may specify for the MFE to drop the packet. At this point, the packet has reached an end point, and the processing is complete. In addition, the flow entry might specify to deliver the packet to a particular physical port (e.g., to a VM connected to the current MFE, to another MFE via a tunnel if the analysis is being performed for the flow entries of a single MFE, to an external network via a gateway, etc.).

When the currently selected flow entry does not cause the packet to reach an end point, the process 700 modifies (at 735) the current packet header representation based on the transfer function and advances to the next stage of packet processing. That is, the packet header representation as modified by the transfer function applied at operation 725 is now set as the current packet header representation. Because this will typically involve modifying the context register, this modification encompasses the advancement of the stage. As the packet header has changed, the process returns to operation 710 and identifies a new set of possible flow entries matched by the new current packet header representation for the new stage.

However, if the current selected flow entry causes the packet to reach an end point, the current path through the flow entries is complete. However, this does not mean that the analysis for the initially input packet header representation is complete, as the partially-wildcarded packet header may have numerous paths through the flow entries. Thus, the process next determines (at 740) whether additional possible flow entries remain at the current stage. If, at operation 710, multiple possible flow entries were identified that the current packet header representation matched, and the current packet header representation has not been processed through all of these flow entries, then the process returns to 715 to select another of the identified flow entries. In this way, the process completes the processing at the most recent branching of the paths through the flow entries before moving back to previous stages.

If there are no more flow entries at the current stage, the process 700 then determines how many stages backwards to move before continuing with the processing. Thus, the process determines (at 745) whether there are any previous stages. If there are no more possible flow entries at the current stage, and there are no previous stages with possible flow entries, then the process has utilized all of the flow entries that the input packet header representation could possibly match, and the process 700 ends.

On the other hand, if there is a previous stage, then the process determines (at 750) whether there are additional possible flow entries at the previous stage. For example, if the most recent stage was a tunnel sending stage for which only one flow entry was identified, a previous stage might have been a logical forwarding stage (identifying a logical egress port) based on a wildcarded destination address, or a distributed firewall enforcement stage for a logical egress port. As such, the previous stage might have numerous additional flow entries through which to process the packet header representation. If there are no additional possible flow entries at the previous stage, the process 700 returns to 745 and continues working backwards until either (i) a stage with additional flow entries is reached or (ii) there are no more previous stages, indicating the end of the process.

When the previous stage does have additional flow entries, the process sets (at 750) the identified previous stage with the additional flow entries as the current stage, and returns to operation 715 to select another possible flow entry. Because the analysis application stores the possible flow entries identified at each iteration of operation 710, the process will already have the possible flow entries for the current stage identified, and will have kept track of whether the flow entry has been processed for this stage. This is a separate piece of data than the reachability flag used at operation 720, as a flow entry may need to be used multiple times for multiple different paths. That is, the flow entries cannot be modeled as a perfectly hierarchical tree, with each "child" flow entry at a later stage only having one "parent" flow entry at an earlier stage. As a simple example, if two VMs for the same logical network operate on the same host (and therefore connect to the same MFE), then packets from both of these VMs may match the same logical forwarding flow entry if the two VMs both send packets to the same destination MAC address.

After performing this process 700 for all possible input packets, the flow reachability application will have effectively generated a flow entry reachability graph for an MFE or a system of MFEs. The flow reachability graph indicates all of the paths through the flow entries, and therefore which flow entries are used and which are not.

Figure 8:
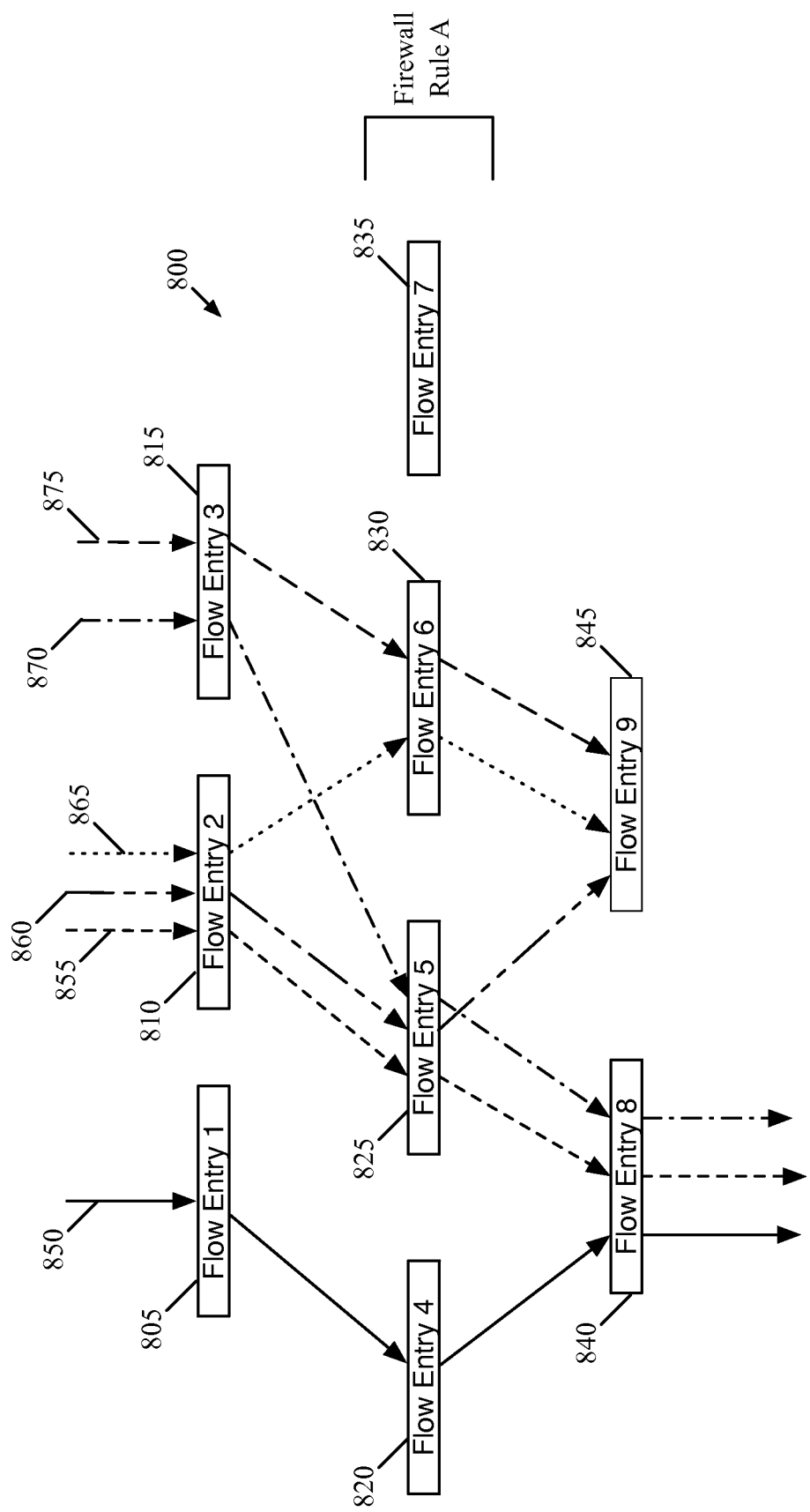
FIG. 8 illustrates a portion of a reachability graph for nine flow entries.

FIG. 8 illustrates a portion of such a reachability graph 800 for nine flow entries. As shown, these flow entries are arranged in three consecutive stages (e.g., based on the context register match conditions of the flow entries). The first stage includes three flow entries 805-815, the second stage includes four flow entries 820-835 that correspond to a distributed firewall rule, and the third stage includes two flow entries 840-845.

In this figure, each of several different paths through the flow entries is illustrated via a different type of solid, dotted, or dashed line 850-875. As shown, packets having different header field values may be processed by the same flow entry at one stage and then subsequently by different flow entries at the next stage. For example, the packets represented by the lines 870-875 each match the flow entry 815, then subsequently match two different flow entries 825 and 830. In addition, packets that match different flow entries at one stage can then subsequently match the same flow entry at the next stage (e.g., the packets represented by the lines 865 and 875 match flow entries 810 and 815, respectively, at the first stage, but then both match the flow entry 830 at the second stage. In some embodiments, when a flow entry B (e.g., the flow entry 840) can be reached by multiple flow entries, A1, ..., An, (e.g., the flow entries 820 and 825), the union of the flow regions of A1, ..., An is referred to as the EFR (Effective Flow Range) of B. In some cases, the EFR for a flow entry may be smaller than the entire flow space.

In some embodiments, all or some of these paths could be generated during one performance of the process 700 of FIG. 7. For example, using the paths 855-865 as an example, a partially wildcarded packet header representation might match only the flow entry 810 at the first stage. At the second stage, the packet header representation matches either the flow entry 825 (represented by the paths 855 and 860) and the flow entry 830 (represented by the path 865). The packet header representation that matches the flow entry 825 next matches either flow entry 840 or flow entry 845, while the packet that matches flow entry 830 matches the flow entry 845 (which drops packets as its action).

Thus, following the process 700, the packet header representation would have flow entry 810 applied, then 825, then 840. At this point, reaching an end point, the process would return to the packet header representation prior to the application of the flow entry 840, and apply 845. As this is also an end point, and there are no more flow entries at the third stage, the process returns to the packet header representation prior to the application of the flow entry 825, and applies flow entry 830, then the flow entry 845.

After applying the various flow entries to all of the possible input packet header representations, the flow reachability analysis identifies all of the paths through the flow entries, as shown by the various lines 850-875 in FIG. 8. This figure also illustrates that the flow entry 835 is never used, or unreachable. Once the unreachable flow entries have been identified, some embodiments identify firewall rules associated with the unreachable firewall flow entries and modify or remove the associated rules from the DFW configuration. Thus, the DFW rule A, from which this flow entry 835 was generated, may be modified so that it will not generate such a flow entry.

Figure 9A:
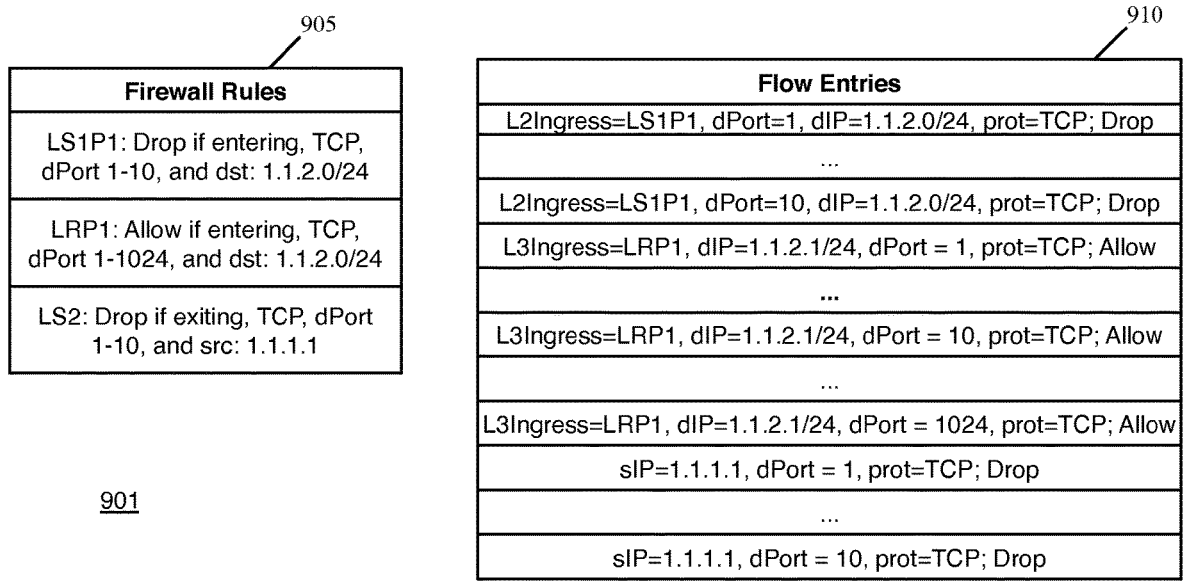
FIGS. 9A-B illustrates an example of modifying firewall rules based on unreachable flow entries.
Figure 9A:
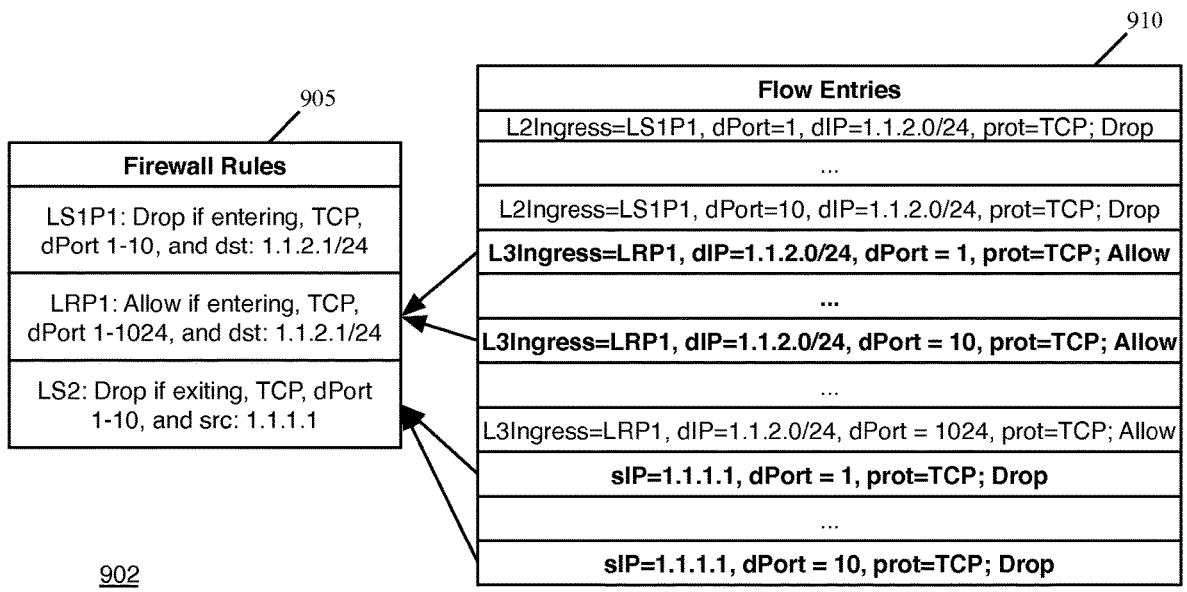
Figure 9B:
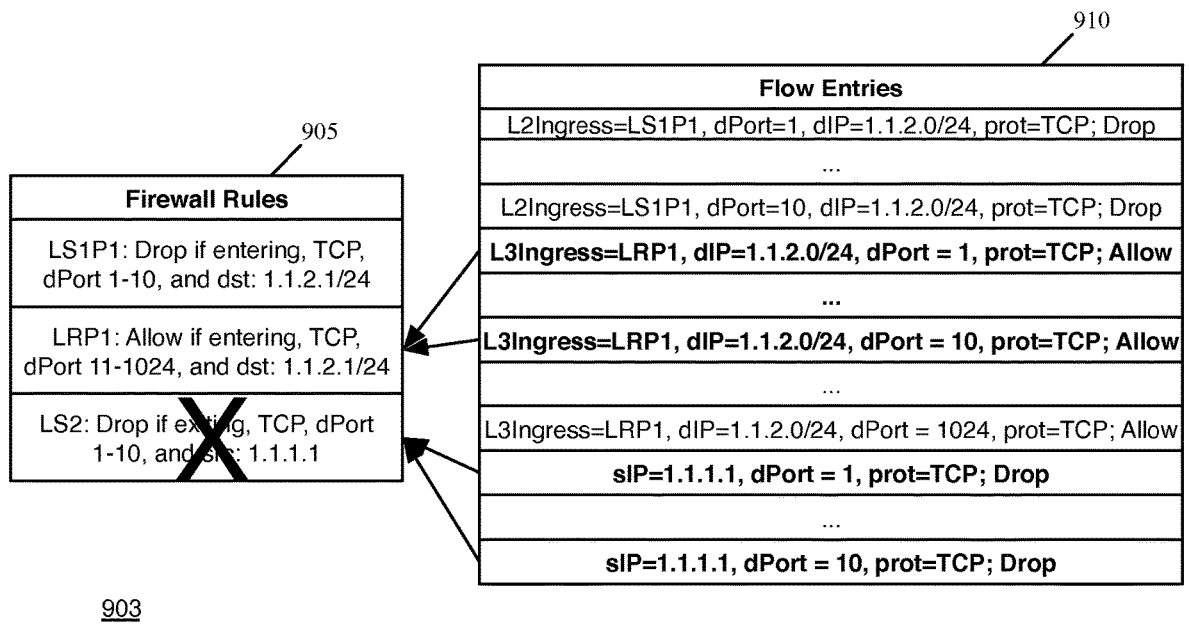
Figure 9B:
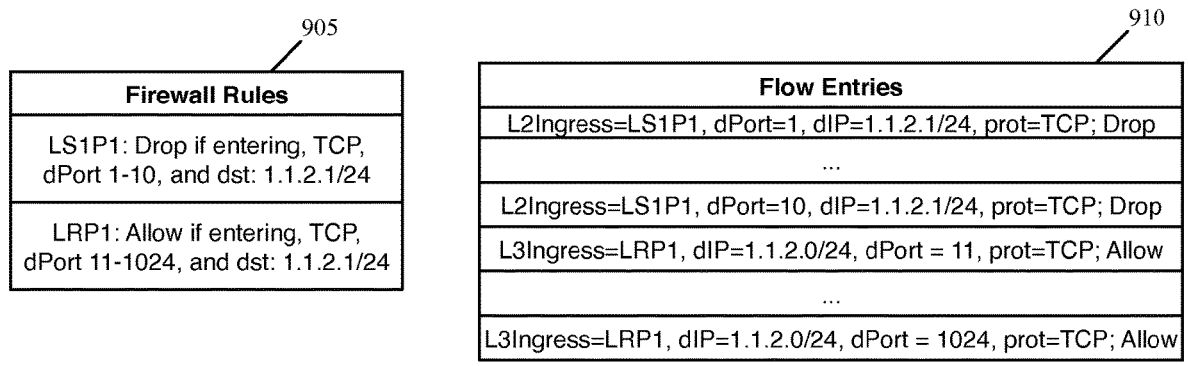

FIGS. 9A-B illustrate an example of modifying the firewall rules based on unreachable firewall flow entries, using four example stages 901-904. The first stage 901 shows firewall rule table 905 and flow entry table 910 with firewall flow entries generated by a network controller (not shown) that correspond to the firewall rules of firewall rule table 905, as described above with reference to FIGS. 1 and 2. Specifically, these firewall flow entries 910 include flow entries for three DFW rules. At a first logical switch port of a first logical switch (LS1P1), the firewall rule indicates to drop TCP packets received at that logical port with a destination IP address in the subnet 1.1.2.0/24 and a destination transport port in the range 1-10.

The second stage 902 shows the results of the network controller performing an analysis of the generated firewall flow entries in order to identify the unreachable firewall flow entries, as described above with reference to FIGS. 6-8. The unreachable firewall rules have been identified (shown in bold). The second stage 902 also shows that the corresponding firewall rule for each of the identified unreachable firewall flow entries is identified by the network controller (or other application) that performs the flow reachability analysis for the firewall rules.

In this case, the unreachable DFW flow entries include some of the flow entries generated for the second firewall rule (for logical router port 1) and all of the flow entries for the third firewall rule (for logical switch 2). Specifically, the flow entries based on the second firewall rule for destination transport ports 1-10 will not be reachable, as the only packets that could enter the logical router via its logical port 1 (LRP1) will have entered the logical switch via the switch's logical port 1 (LS1P1). However, any such TCP packets with a destination IP address in the subnet 1.1.2.0/24 and a destination transport port in the range 1-10 will match the firewall flow entries corresponding to the first rule, which would specify to drop the packets. As such, the only packets that could match these ten flow entries for the second rule will have already been dropped, and thus these flow entries are unreachable. The remaining flow entries corresponding to this DFW rule, however, will be reachable and are therefore not affected.

The flow entries corresponding to the third firewall rule are only unreachable in certain cases, depending on how the input packet headers are generated. If the packet modeling and flow entry reachability uses packets with any possible IP address entering the logical router 115 from the external network 120, then these flow entries would be reachable, as packets with such characteristics could have a source IP of 1.1.1.1 and still reach the logical switch 110. However, if the subnets of the two logical switches (1.1.1.0/24 and 1.1.2.0/24) are excluded from consideration (and packets sent from VM2 or VM3 spoofing the source IP address of 1.1.1.1 are excluded as well), then these flow entries would not be reachable.

The third stage 903 of FIG. 9 shows the modification of the firewall rule table 905 based on analysis of the unreachable flow entries. The second firewall rule for LRP1 is modified to only relate to destination transport ports 11-1024, because packets with destination ports 1-10 that match the other characteristics of the rule would never reach this particular rule. The third firewall rule is marked for deletion, as none of the firewall flow entries associated with this rule can reached by a packet, assuming the constraints on input described above. In the fourth stage 904, the flow entries table 910 has a new, shorter list of flow entries based on the modified firewall rules table 905.

The network controller of some embodiments then propagates the new smaller list of flow entries to managed forwarding elements in the physical network to enforce the modified firewall rules of the distributed firewall. In some embodiments, however, the flow entries are only used for analysis of the distributed firewall rules. Some embodiments enforce the distributed firewall rules using other mechanisms (e.g., as function calls at different times in the packet processing pipeline, etc.). However, some such embodiments nevertheless use the flow entries as a mechanism to analyze the firewall rules to determine conflicting rules that will never be reached. While the examples shown above in FIGS. 1, 2, and 9 are simple examples in which the conflicts are apparent, some embodiments may involve much more complicated sets of rules (e.g., dozens or hundreds of rules at each enforcement point, with dozens or hundreds of enforcement points in the logical network). In such cases, the unreachable rules or portions of rules may not be apparent, and headerspace analysis may be used to identify such issues.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
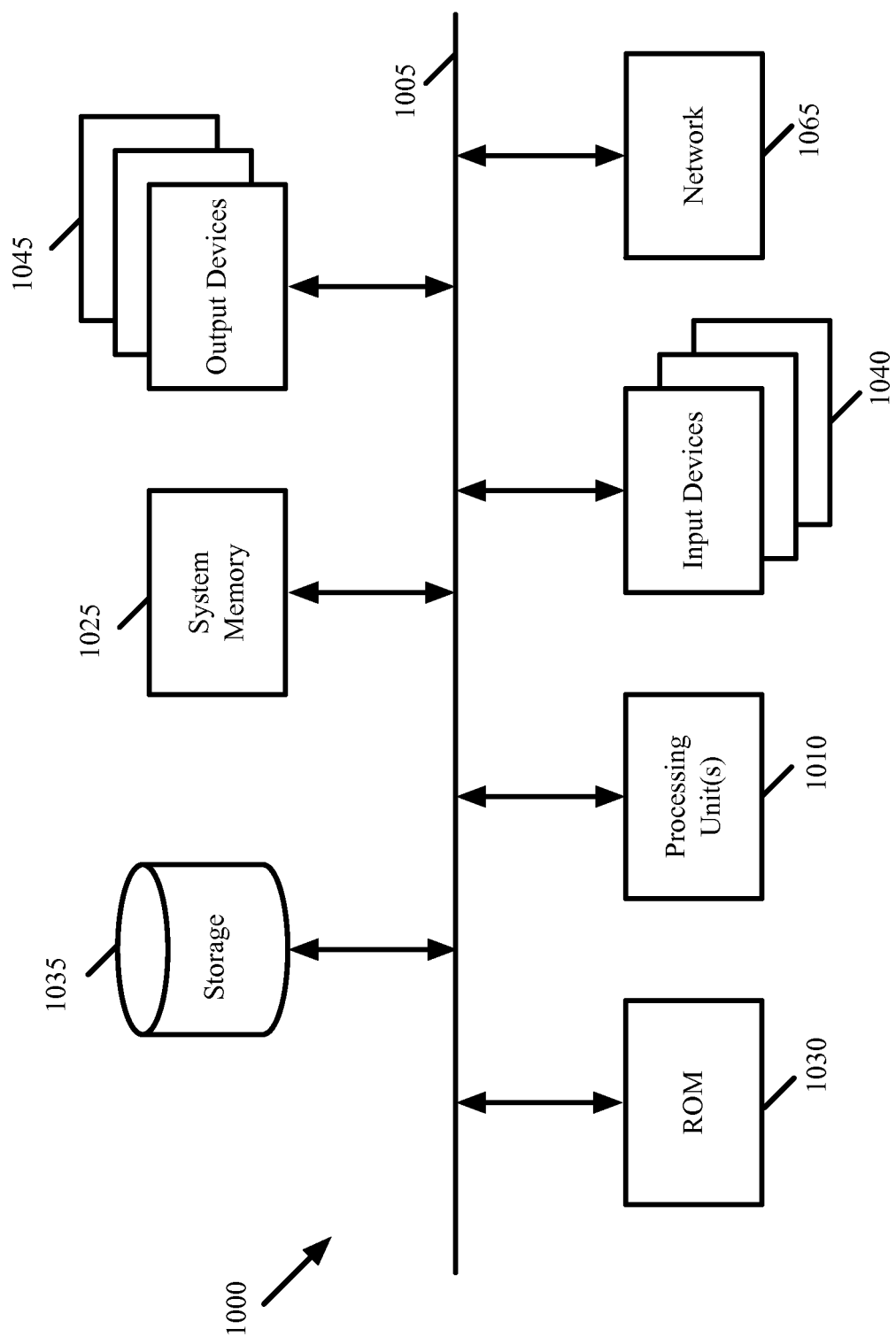
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6, and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for identifying unnecessary firewall rules for a distributed firewall of a logical network, the method comprising:
    identifying a firewall policy for network traffic of the logical network, the firewall policy comprising a set of firewall rules;
    generating a set of data for implementing the firewall policy on a set of managed forwarding elements that implement the logical network;
    simulating a set of potential network traffic that would be processed by the managed forwarding elements while implementing the logical network by generating representations of packet headers of the potential network traffic;
    analyzing the representations of the packet headers of the potential network traffic based on the generated set of data to identify a subset of unnecessary data; and
    identifying a subset of unnecessary firewall rules of the set of firewall rules that corresponds to the subset of unnecessary data.

2. The method of claim 1, wherein simulating the set of potential network traffic comprises generating representations of packet headers of all potential network traffic, wherein analyzing the representations of the packet headers of the potential network traffic comprises:
    identifying a set of transfer functions that represent the generated set of data; and
    applying the set of transfer functions to the representations of packet headers of all potential network traffic to identify the subset of unnecessary data as portions of the set of data that are not reached by the potential network traffic.

3. The method of claim 1 further comprising propagating only portions of the generated set of data that do not correspond to the subset of unnecessary firewall rules to the set of managed forwarding elements.

4. The method of claim 1, wherein the generated set of data is a first set of data, the method further comprising generating a second set of data for propagating to the set of managed forwarding elements in order to implement the firewall policy.

5. The method of claim 1 further comprising presenting the subset of unnecessary firewall rules to a user.

6. The method of claim 1 further comprising removing the subset of unnecessary firewall rules from the firewall policy.

7. The method of claim 1, wherein the set of firewall rules comprises a plurality of firewall rules for a plurality of enforcement points of the logical network.

8. The method of claim 7, wherein the enforcement points of the logical network include at least one of a logical switch port, a logical switch, a logical router port, and a logical router.

9. The method of claim 7, wherein identifying the subset of unnecessary firewall rules comprises identifying redundant rules in the different sets of firewall rules.

10. The method of claim 7, wherein identifying the subset of unnecessary firewall rules comprises identifying conflicting rules in different sets of firewall rules.

11. The method of claim 1, wherein the generated set of data comprises a plurality of flow entries, wherein each flow entry comprises a set of conditions to be matched by a packet header and a set of actions to perform on a packet that matches the set of conditions.

12. A non-transitory machine readable medium storing a program which when executed by at least one processing unit identifies unnecessary firewall rules for a distributed firewall of a logical network, the program comprising sets of instructions for:
    identifying a firewall policy for network traffic of the logical network, the firewall policy comprising a set of firewall rules;
    generating a set of data for implementing the firewall policy on a set of managed forwarding elements that implement the logical network;
    simulating a set of potential network traffic that would be processed by the managed forwarding elements while implementing the logical network by generating representations of packet headers of the potential network traffic;
    analyzing the representations of the packet headers of the potential network traffic based on the generated set of data to identify a subset of unnecessary data; and
    identifying a subset of unnecessary firewall rules of the set of firewall rules that corresponds to the subset of unnecessary data.

13. The non-transitory machine readable medium of claim 12, wherein the set of instructions for simulating the set of potential network traffic comprises a set of instructions for generating representations of packet headers of all potential network traffic, wherein the set of instructions for analyzing the potential network traffic comprises sets of instructions for:
    identifying a set of transfer functions that represent the generated set of data; and
    applying the set of transfer functions to the representations of packet headers of all potential network traffic to identify the subset of unnecessary data as portions of the set of data that are not reached by the potential network traffic.

14. The non-transitory machine readable medium of claim 12, wherein the program further comprises a set of instructions for propagating only portions of the generated set of data that do not correspond to the subset of unnecessary firewall rules to the set of managed forwarding elements.

15. The non-transitory machine readable medium of claim 12, wherein the generated set of data is a first set of data, the program further comprising a set of instructions for generating a second set of data for propagating to the set of managed forwarding elements in order to implement the firewall policy.

16. The non-transitory machine readable medium of claim 12, wherein the program further comprises a set of instructions for removing the subset of unnecessary firewall rules from the firewall policy.

17. The non-transitory machine readable medium of claim 12, wherein the set of firewall rules comprises a plurality of firewall rules for a plurality of enforcement points of the logical network.

18. The non-transitory machine readable medium of claim 17, wherein the enforcement points of the logical network include at least one of a logical switch port, a logical switch, a logical router port, and a logical router.

19. The non-transitory machine readable medium of claim 17, wherein the set of instructions for identifying the subset of unnecessary firewall rules comprises a set of instructions for identifying conflicting rules in different sets of firewall rules.

20. The non-transitory machine readable medium of claim 12, wherein the generated set of data comprises a plurality of flow entries, wherein each flow entry comprises a set of conditions to be matched by a packet header and a set of actions to perform on a packet that matches the set of conditions.

\* \* \* \* \*